United States Patent
Lehmann et al.

[15] 3,673,102
[45] June 27, 1972

[54] CATHODOLUMINESCENT CALCIUM SULFIDE COMPOSITIONS WITH IMPROVED FAST DECAY CHARACTERISTIC

[72] Inventors: Willi Lehmann, Murrysville; Frederick M. Ryan, New Alexandria, both of Pa.

[73] Assignee: Westinghouse Electric Corporation, Pittsburgh, Pa.

[22] Filed: Sept. 29, 1970

[21] Appl. No.: 76,400

[52] U.S. Cl. .................................................... 252/301.4 S
[51] Int. Cl. ............................................................ C09k 1/12
[58] Field of Search ............................................. 252/301.4 S

[56] References Cited

OTHER PUBLICATIONS

Lenard et al., Handbuch Der Experimental Physik Iteil, 1928, pages 342– 346

Kroger, Some Aspects of the Luminescence of Solids, 1948, pages 228– 229

*Primary Examiner*—Robert D. Edmonds
*Attorney*—A. T. Stratton and W. D. Palmer

[57] ABSTRACT

The selected calcium sulfide cathodoluminescent materials which exhibit an inherent rapid decay characteristic after cathodoluminescent excitation exhibit an even faster decay characteristic when a predetermined amount of cobalt is incorporated into the composition. The amount of cobalt is preferably from about 0.001 gram-atom percent to one gram-atom percent taken with respect to the moles of calcium sulfide, with the energy efficiency of luminescence and the length of the time of phosphorescence decreasing with increasing cobalt content.

8 Claims, 6 Drawing Figures

3,673,102

CATHODOLUMINESCENT CALCIUM SULFIDE COMPOSITIONS WITH IMPROVED FAST DECAY CHARACTERISTIC

BACKGROUND OF THE INVENTION

Cathodoluminescent phosphor compositions which exhibit a fast decay of phosphorescence after excitation are of value for specialized cathode ray tube applications, such as for flying spot scanners. This fast decay characteristic allows for the presentation of increased information with greater clarity. Calcium sulfide is a well known matrix constituent for cathodoluminescent phosphors. In copending application, Ser. No. 876,766 filed Nov. 14, 1969, and owed by the assignee of the present invention is disclosed an ultraviolet emitting cathodoluminescent calcium sulfide composition activated for lead and halogen. In copending application, Ser. No. 869,468 filed Oct. 27, 1969, and owned by the assignee of the present invention, and now abandoned, with the subject matter thereof disclosed in copending application, Ser. No. 128,328, filed Mar. 26, 1971, which is a continuation-in-part of said abandoned application and owned by the present assignee, is described a calcium sulfide composition coactivated with predetermined amounts of at least one of the elements, chlorine, bromine, iodine, or phosphorus, and activated with cerium, europium, or a mixture of cerium and europium. The aforementioned sulfide phosphors all exhibit a rapid decay of phosphorescence after excitation

SUMMARY OF THE INVENTION

It has been discovered that the fast decay characteristic of selected calcium sulfide cathodoluminescent phosphor composition can be improved by incorporating a predetermined amount of cobalt. The calcium sulfide compositions are activated with selected combinations of elements in practicing the invention. The amount of cobalt incorporated is preferably from about 0.001 gram-atom percent to 1 gram-atom percent with respect to the moles of calcium sulfide, with the energy efficiency of luminescence and the length of time of phosphorescence decreasing with increasing cobalt content.

DESCRIPTION OF THE PREFERRED EMBODIMENTS

The phosphor composition according to the present invention can be prepared for example by intimately mixing about 1 mole of calcium sulfide, $5 \times 10^{-4}$ moles of cerium oxide ($CeO_2$), 0.01 mole of ammonium chloride, 0.001 gram-atom of finely divided cobalt powder, and about 0.1 gram-atom of finely divided sulfur. This mixture provides a cobalt content of 0.1 gram-atom percent taken with respect to the mole of calcium sulfide. The raw mix is disposed in a loosely capped quartz tube. An inert atmosphere such as argon is provided and the mixture is fired at from about 1,000° to 1,400° C. for at least 1 hour. The free sulfur in the raw mix vaporizes and provides a sulfurizing atmosphere. The ammonium chloride acts as a reaction flux, and a portion of the chlorine is incorporated into the luminescent material so that the final composition contains about 0.05 gram-atom percent chlorine based on the moles of sulfide. The phosphor is preferably fired at about 1,200° C. for about 2 hours. The cobalt can be supplied to the raw mix as finely divided metal powder, by convenient volatilizable compounds such as cobalt chloride $CoCl_2$, or cobalt sulfate $CoSO_4$. The cobalt can be included in the initial raw mix in preparing the final phosphor, or the cerium and chlorine can first be incorporated into the calcium sulfide in a first firing, and the cobalt added by a second firing.

Figure 1:
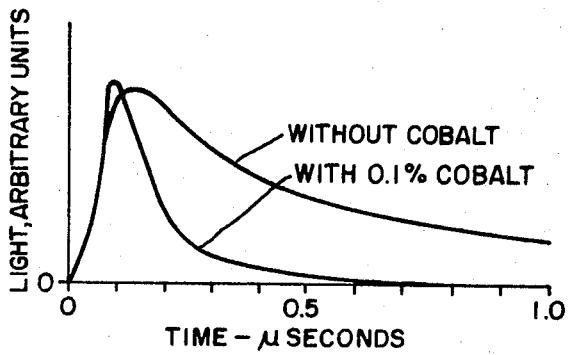
FIG. 1 is a plot comparing the decay curves of light emission for a green emitting calcium sulfide composition activated with cerium, chlorine with an without cobalt. The light output is plotted in arbitrary units and time is in microseconds.
Figure 2:
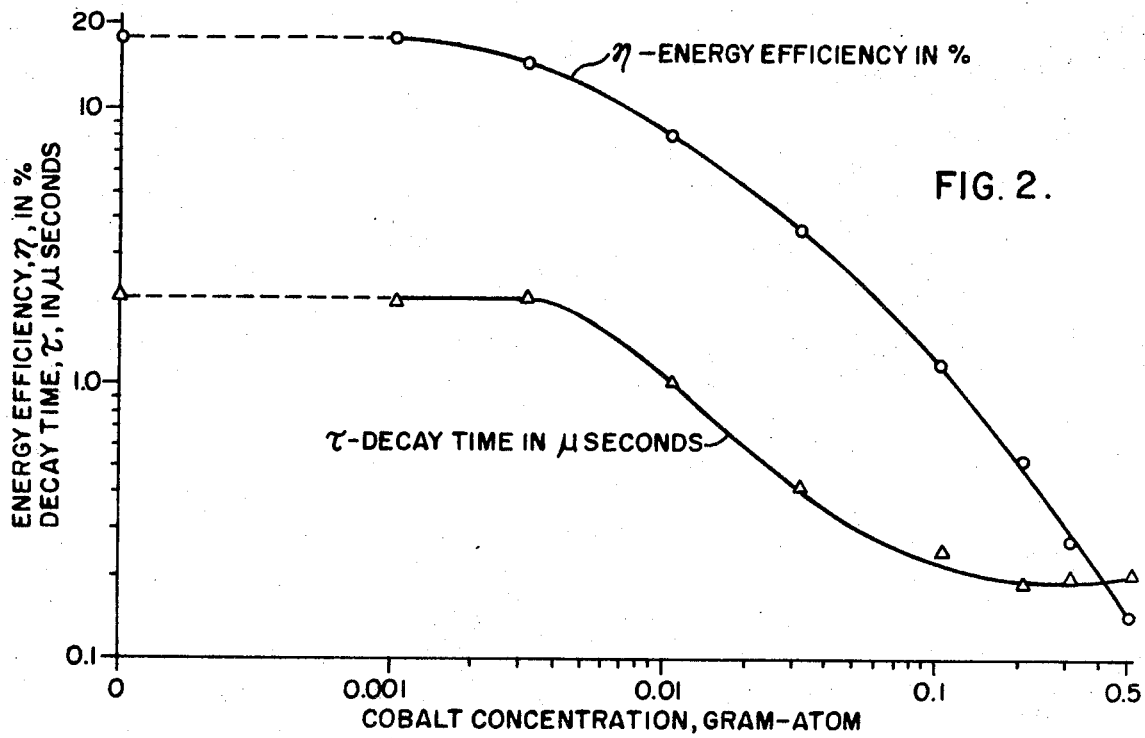
FIG. 2 is a plot of the energy efficiency $\eta$, and decay time $\tau$ to one-tenth of the peak emission for a green emitting calcium sulfide phosphor activated with cerium, chlorine, and containing varied concentrations of cobalt.

The phosphor described above, when excited by short electron beam pulses, with about a 50 nanoseconds duration at about 10 kilovolts, with about a 10 milliampere per square centimeter current density, produces an emission with two fairly narrow bands which peak at about 523 and 590 nanometers. As seen in FIG. 1, a typical decay time to one-tenth of the original phosphorescent light output is had in about 0.25 to 0.3 microsecond with the addition of 0.1 gram-atom percent cobalt. The response of this material without the addition of cobalt is also shown. In FIG. 2, the effect upon emission energy efficiency and decay time is shown with respect to various cobalt concentrations in gram-atom percent cobalt added as based on the moles of sulfide. The energy efficiency of emission is decreased as the cobalt concentration is increased. The length of time of phosphorescence is also decreased with increasing cobalt. It is thus apparent that a tradeoff of energy efficiency for fast decay is had by increasing the cobalt content. Thus, it is preferred that the cobalt content be from about 0.001 gram-atom percent to 1 gram-atom percent based on the moles of calcium sulfide to provide reasonable efficiency.

Figure 3:
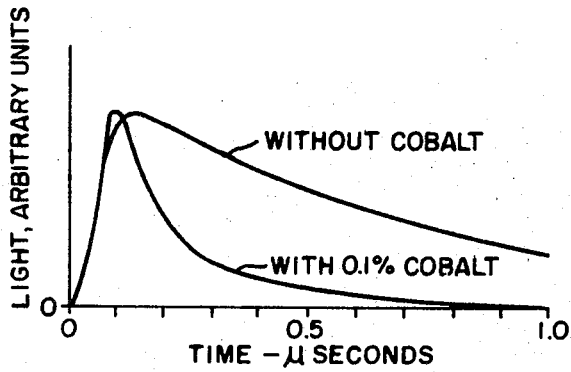
FIG. 3 is a plot of the decay characteristic of light output for a red emitting calcium sulfide composition activated with divalent europium, and chlorine with and without cobalt.
Figure 4:
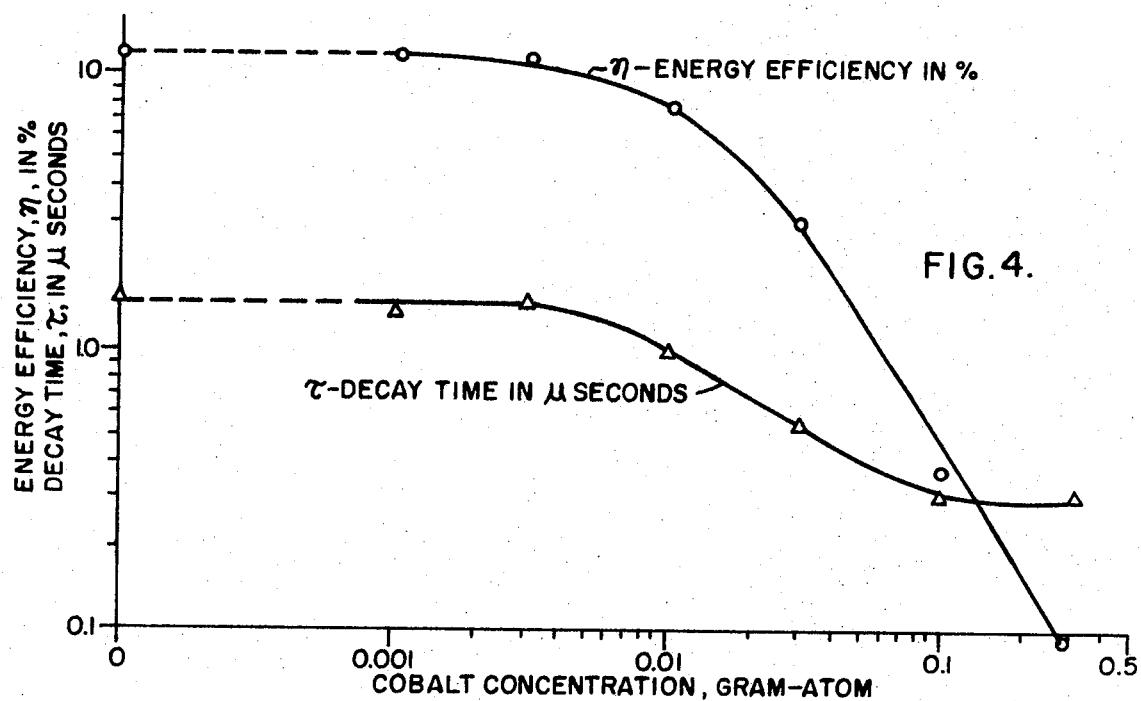
FIG. 4 is a plot of energy efficiency of emission and a decay time to one-tenth of the original emission level for the calcium sulfide composition activated with divalent europium, chlorine, and containing varied concentrations of cobalt.

A red emitting calcium sulfide phosphor according to the invention can be similarly prepared by providing a raw mix of 1 mole calcium sulfide, $5 \times 10^{-4}$ mole of europium chloride, 0.01 mole of ammonium chloride, 0.001 gram-atom cobalt, and about 0.1 mole of sulfur. The raw mix is again fired as described above and the decay characteristics upon cathodoluminescent excitation as shown in FIG. 3. This composition emits in a single narrow band at about 650 nanometers. A typical decay time to one-tenth of the original value is had in about 1.6 microseconds without the addition of cobalt, and in about 0.3 microsecond with the addition of 0.1 gram-atom percent cobalt. The effect of varying the cobalt concentration for this composition is shown in FIG. 4.

In preparing the calcium sulfide composition primarily activated by cerium, europium, and a mixture of cerium and europium, other efficient coactivators such as iodine, bromine, fluorine, or phosphorus can be substituted for the chlorine. The cerium and/or europium activators are found to be effective within the range of about $10^{-5}$ to $10^{-2}$ (gram-atoms per mole of sulfide) while the atom ratio of the halogen or phosphorus to the cerium and/or europium should be from about 1:1 to about 10:1. The preparation and characteristics of the cerium and/or europium activated calcium sulfide composition with the aforementioned coactivators is more fully described in the aforementioned copending application, Ser. No. 869,468 and reference may be had thereto for a more complete description.

Figure 6:
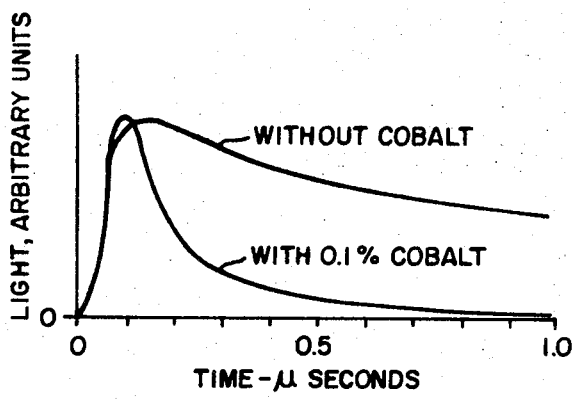
FIG. 6 is a plot of the decay curves of light emission for an ultraviolet admitting calcium sulfide composition activated with lead, chlorine with and without cobalt.

Another composition of the present invention can be prepared by providing a raw mix of about 1 mole of calcium sulfide, $10^{-4}$ mole of lead sulfide, and $10^{-2}$ mole of calcium chloride, with about 0.001 gram-atom of cobalt and about 0.1 gram-atom of finely divided sulfur. This raw mix is disposed in a loosely capped quartz container, and fired in an inert or sulfurized atmosphere at about 1,200° C. for about 1 hour. The phosphor produced is a very efficient ultraviolet emitting material which emits as a narrow band peaking at about 365 nanometers. This phosphor seems to be particularly sensitive to small cobalt concentrations. The typical decay time to one-tenth the original emission is had in about 12 microseconds without the addition of cobalt, whereas a decay to about one-tenth emission is had in about 1.5 to 2 microseconds for only a 0.001 gram-atom percent addition of cobalt, and to about 0.32 microseconds with a 0.1 gram-atom percent addition of cobalt. The decay curves for this composition as shown in FIG. 6. The lead is preferably present in an activating proportion of from about $10^{-5}$ to $10^{-3}$ gram-atom percent based on sulfide, and the chlorine can be substituted for by bromine or iodine, with the gram-atom amount of halogen being at least equal to and up to about 10 times greater than the lead gram-atom content. This phosphor composition without the addition of cobalt is described in the aforementioned application, Ser. No. 876,766 which may be referred to for a more complete description.

In yet another embodiment of the present invention calcium sulfide phosphor is activated by bismuth, sodium and made with addition of cobalt. This composition is prepared from a raw mix of about 1 mole calcium sulfide, 0.0001 mole bismuth, 0.01 mole of sodium, and 0.001 gram-atom of cobalt, and 0.1 gram-atom of finely powdered sulfur. In general the bismuth content can be varied from about $10^{-5}$ to $10^{-3}$ gram-atom of bismuth per mole of calcium sulfide, with the sodium coactivator content being at least equal to the bismuth content and up to about ten times greater than the bismuth content.

Figure 5:
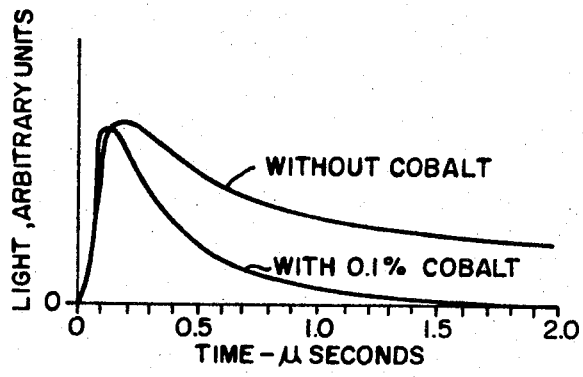
FIG. 5 is a plot of the decay curve of light emission for a blue emitting calcium sulfide composition activated with bismuth and sodium with and without cobalt.

This raw mix is fired as described above for the other embodiments and the resultant phosphor emits as a fairly narrow band peaking at about 450 nanometers. The typical decay time to about one-tenth of the original emission is had in about 6 microseconds without the addition of cobalt, and in about 0.8 microseconds with the addition of 0.1 gram-atom percent cobalt as is seen in FIG. 5.

The calcium sulfide phosphors herein described containing cobalt for improving the fast decay characteristic exhibit a high efficiency of emission, a good color stability excellent burn resistance, with a wide range of emission colors being available.

We claim:

1. Efficient cathodoluminescent phosphor composition with an improved fast decay characteristic after cathodoluminescent excitation, and wherein said composition is calcium sulfide activated with Bi, Pb, or at least one of Ce and Eu and coactivated with Na when the activator is Bi, and coactivated with Cl, Br, F, and/or I when the activator is Pb, and coactivated with Cl, Br, I, F or P when the activator is Ce and/or Eu, and wherein the improved fast decay characteristic is provided by incorporating a small predetermined amount of cobalt.

2. The composition as specified in claim 1, wherein the amount of cobalt is preferably from about 0.001 gram-atom percent to 1 gram-atom percent based on the moles of calcium sulfide, with the energy efficiency of luminescence and the length of time of phosphorescence decreasing with increasing cobalt.

3. The composition as specified in claim 1, wherein said composition is activated by cerium and/or divalent europium in the amount of $10^{-5}$ to $10^{-2}$ mole of the sulfide, and coactivated with chlorine, bromine, iodine, fluorine, or phosphorus in amount such that the atom ratio of coactivator to cerium and/or europium is from about 1:1 to 10:1.

4. The composition as specified in claim 3, wherein the amount of cobalt is preferably from about 0.001 gram-atom percent to 1 gram-atom percent taken with respect to moles of calcium sulfide, with the energy efficiency of luminescence and the length of time of phosphorescence decreasing with increasing cobalt.

5. The composition as specified in claim 1, wherein said composition is activated by lead in an amount of $10^{-5}$ to $10^{-3}$ gram-atom based on the moles of sulfide, and coactivated with chlorine, bromine, fluorine, and/or iodine in an atom amount at least equal to the lead content and up to about ten times greater than the lead content.

6. The composition as specified in claim 5, wherein the amount of cobalt is preferably from about 0.001 gram-atom percent to 1 gram-atom percent taken with respect to moles of calcium sulfide, with the energy efficiency of luminescence and the length of time of phosphorescence decreasing with increasing cobalt.

7. The composition as specified in claim 1, wherein said composition is activated by bismuth in an amount of $10^{-5}$ to $10^{-3}$ and coactivated with sodium in an atom amount of at least equal to the amount of bismuth and up to about 10 times greater than the bismuth content.

8. The composition as specified in claim 7, wherein the amount of cobalt is preferably from about 0.001 gram-atom percent to 1 gram-atom percent taken with respect to moles of calcium sulfide, with the energy efficiency of luminescence and the length of time of phosphorescence decreasing with increasing cobalt.

* * * * *